United States Patent
Rousseau

(10) Patent No.: US 6,789,464 B2
(45) Date of Patent: Sep. 14, 2004

(54) DEVICE FOR LOADING SLICES OF BREAD IN A TOASTER

(75) Inventor: Alain Rousseau, Le Syndicat (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 10/469,053

(22) PCT Filed: Feb. 20, 2002

(86) PCT No.: PCT/FR02/00639
§ 371 (c)(1),
(2), (4) Date: Aug. 26, 2003

(87) PCT Pub. No.: WO02/067738
PCT Pub. Date: Sep. 6, 2002

(65) Prior Publication Data
US 2004/0083900 A1 May 6, 2004

(30) Foreign Application Priority Data
Feb. 26, 2001 (FR) .............................................. 0102606

(51) Int. Cl.⁷ ................................................ A47J 37/08
(52) U.S. Cl. ........................... 99/386; 99/385; 99/387; 99/389; 99/391
(58) Field of Search .......................... 99/325–334, 337, 99/341, 338, 385–395, 400, 401, 426, 443 C, 443 R, 444–450; 219/521, 524, 400, 388

(56) References Cited

U.S. PATENT DOCUMENTS

| 2,714,348 A | | 8/1955 | Fokakis |
| 3,220,336 A | * | 11/1965 | Hoover .......................... 99/399 |
| 3,418,920 A | * | 12/1968 | Alexander .................... 99/386 |
| 3,659,518 A | * | 5/1972 | Porter .......................... 99/386 |
| 4,164,591 A | | 8/1979 | Ahlgren et al. |
| 4,226,176 A | | 10/1980 | Macchi |
| 4,530,276 A | | 7/1985 | Miller |
| 4,577,550 A | * | 3/1986 | Maroti et al. ........... 99/329 RT |
| 6,062,128 A | | 5/2000 | Borgward |

FOREIGN PATENT DOCUMENTS

| DE | 2 109 784 | 9/1972 |
| GB | 2 308 291 | 6/1997 |

* cited by examiner

Primary Examiner—Timothy F. Simone
(74) Attorney, Agent, or Firm—Browdy and Neimark, P.L.L.C.

(57) ABSTRACT

An automatic toaster, comprising heating means (2) with slices of bread pass passing in front of said heating means, and means for transporting slices of bread to said heating means, characterized in that the means for transporting the slices of bread include a spiral-shaped rotating element (6) defining a plurality of housings (11) for slices of bread (30), the length of said housings corresponding essentially to the pitch of the spiral (6).

16 Claims, 8 Drawing Sheets

DEVICE FOR LOADING SLICES OF BREAD IN A TOASTER

TECHNICAL FIELD

The invention is related to the field of household electrical appliances, and more precisely to that of electric toasters. It concerns more particularly an improved toaster equipped with a loading device permitting the transport of slices of bread toward the heating elements.

PRIOR ART

In a general manner, a toaster has heating means that can operate either by radiation or by conduction.

In the first case, the slices of bread to be toasted come in front of the radiant heating elements and thus receive the quantity of energy necessary for their cooking. In the second case, the slices of bread to be toasted come into contact with the element heating by conduction during a time necessary to obtain satisfactory cooking.

In toasters of simple and traditional design, slices of bread are supplied to the appliance manually, by disposing the slices in appropriate housings. Improvements already proposed to toasters of this type consist in equipping the appliance with automatic loading devices. Due to these loading devices, several slices of bread can be transported successively into the heating zones of the toaster in front of which they pass.

A first example of such a toaster is described in the document U.S. Pat. No. 2,714,348. This toaster comprises heating means that include the actual heating elements, and a transport mechanism that permits the transport of slices of toast in front of the heating elements.

This toaster equally comprises a reservoir for slices of bread to be toasted. This reservoir opens in proximity to the heating zone. The bread slices that are stored are delivered progressively under the action of a spring that tends to push the bread slices outside of the reservoir.

This toaster thus presents the advantage of being able to perform in an automatic manner toasting of a substantial number of slices without requiring intervention by the user. However, it presents the major drawback of only operating on perfectly flat slices of bread, of the "toast" type. In effect, the arrangement of the heating means and the geometry of the reservoir cannot in any case be adapted to bread slices of a certain thickness or that present varied forms.

In addition, the pressure exerted on the slices by the spring located at the bottom of the reservoir is a source of crushing of the bread slices, which is prejudicial to good cooking and to the appearance of the toasted bread.

There has also been proposed another type of automatic toaster in the document GB 2 308 291. Such a toaster has horizontal heating elements in front of which circulates a conveyer belt. This toaster is equally equipped with a cylindrical reservoir having multiple radial housings intended to receive bread slices. This reservoir or loader is disposed above the heating elements and can be driven in rotation. During this rotation movement, each housing passes at the base of a slot within which the bread slice falls under gravity onto the conveyer belt. Thus, in proportion with the rotation of the loading reservoir, the totality of slices are transported to the destination of the heating means and then toasted.

Such a toaster has the advantage of assuring an automatic operation, but it presents equally the drawback of being particularly sensitive to the geometry of the bread slices which must, of necessity, pass through slots formed under the loading reservoir. In other words, this toaster does not permit the toasting of slices having relatively large dimensions or of varied geometries.

The object of invention is to propose a toaster that assures an automatic feeding of the heating means starting from a substantial number of bread slices prepared for this purpose and that are insensitive to the size and the general form of the slices to be toasted.

SUMMARY OF THE INVENTION

The invention thus concerns an automatic toaster that comprises:

heating means in front of which pass the bread slices to be toasted;

means for transporting the bread slices toward the heating means.

According to the invention, this toaster is characterized in that the means for transporting the bread slices toward the heating means comprise a rotatable element following a spiral form, defining a plurality of housings for the bread slices, said housings having a length corresponding substantially to the pitch of the spiral.

Stated in other terms, the toaster has a loader forming a sort of screw between the turns of which can be placed the different slices of bread to be toasted. When the spiral turns about its axis, the different turns are displaced while carrying the bread slices in the direction of the axis of the spiral. The bread slices are thus transported into proximity of the heating means due to the rotating element that forms a type of Archimedes screw. Such a screw in the form of a spiral is relatively insensitive to the dimensions of the slices of bread to be displaced, which thus permits it to be adapted to different types of bread or at least different slice geometries, It will be recalled that the geometric definition of a spiral is a curve whose tangents form a constant angle with a given direction. In the case of a circular spiral, corresponding to the case where the spiral is included in a cylinder of revolution, the spiral is characterized by its axis and its radius, its direction of rotation and its pitch that corresponds to the constant length that separates two consecutive points of intersection of the curve with a fixed generatrix situated on the cylinder.

Complementarily, the heating means include means for conveying the bread slices in succession. In this manner, after having been transported by the characteristic loader, the bread slices are positively driven one after the other in contact with or facing the actual heating elements.

In practice, the movement of the bread slices in succession in front of the heating elements can be effectuated either vertically or horizontally.

Thus, when the movement in succession is horizontal, the bread slices are transported by the characteristic loader on a lateral side of the heating means, then taken up by these latter. Inversely, when the movement of the bread slices in succession is effected vertically, the characteristic loader displaces the bread slices to be toasted until coming into proximity to the top of the heating means.

Then, the slices are displaced vertically by the means for passage in succession, after possibly a slight displacement by gravity.

In a preferred form, the characteristic axis of the spiral is inclined in a horizontal plane at a non-zero angle α with respect to a perpendicular to the plane of passage of the bread slices into the heating means. Stated in other terms, due to this arrangement, the bread slices leave the loader while being oriented in an optimal manner in order to penetrate into the interior of the heating means.

More precisely, the angle α formed by the axis of the spiral can be deduced from the pitch and the radius of the spiral, as well as the thickness of the bread to be toasted.

According to another characteristic of the invention, when the passage of the slices into the heating means is effectuated vertically, the axis of the spiral can advantageously be inclined in a vertical plane, by a non-zero angle β with respect to the horizontal. This angle is oriented in such a manner that the axis of the spiral is oriented toward the top in the direction of advancement of the bread slices. In this manner, the bread slices present in the loader are given a vertical inclination such that sliding toward the heating means is optimized. In effect, it is appropriate to avoid that the bread slices tilt toward the front when they leave the characteristic spiral.

Advantageously, in practice one can also provide at the level of the feeding means, an abutment situated at the end of the rotatable element, able to prevent tilting of the bread slices when these latter reach the end of the rotatable element.

Thus, any unexpected movement of the bread slices toward the front, which could provoke them to drop outside of the heating means, is prevented.

In an advantageous form, the toaster according to the invention can also have means for stocking bread slices coming from a heating means or for displacing them toward a receptacle. The bread slices are then displaced from their outlet from the heating means toward a zone intended for their collection.

In a preferred form, the means utilized for stocking or displacing the slices toward the receptacle in question are formed by a second spiral shaped rotatable element. Stated in other terms, when the bread slices leave the heating means, they come to be placed in the housing formed between the different turns of a second spiral. These slices are then possibly transported toward the outlet receptacle. As for the inlet loader, the orientation of this second spiral can be optimized in order for the bread slices to be placed in these housings while remaining parallel to their orientation in the heating means.

Different variants of the heating means can be employed in the toaster according to the invention.

Thus, in a first variant, these heating means can comprise at least one radiant heating element, and a conveyor able to transport the bread slices in front of this heating element. Advantageously, the heating means include at least two heating elements situated at each side of the bread slices to be toasted.

According to another variant, the heating means can comprise at least one heating roller with which the bread slices come in contact, this heating roller being able to convey the bread slices.

Stated in other terms, the heating means comprise several rollers that form a calender between which the bread slices are gripped during their heating.

BRIEF DESCRIPTION OF THE FIGURES

The manner of carrying out the invention as well as the advantages that flow therefrom will-appear clearly from the description of the embodiments that follow, given by way of non limiting example in which.

MANNER OF ACHIEVING THE INVENTION

As already mentioned, the invention concerns an improved toaster that is equipped with specific heating means permitting the heating of a relatively large number of bread slices successively to be assured in an automatic manner.

Figure 1:
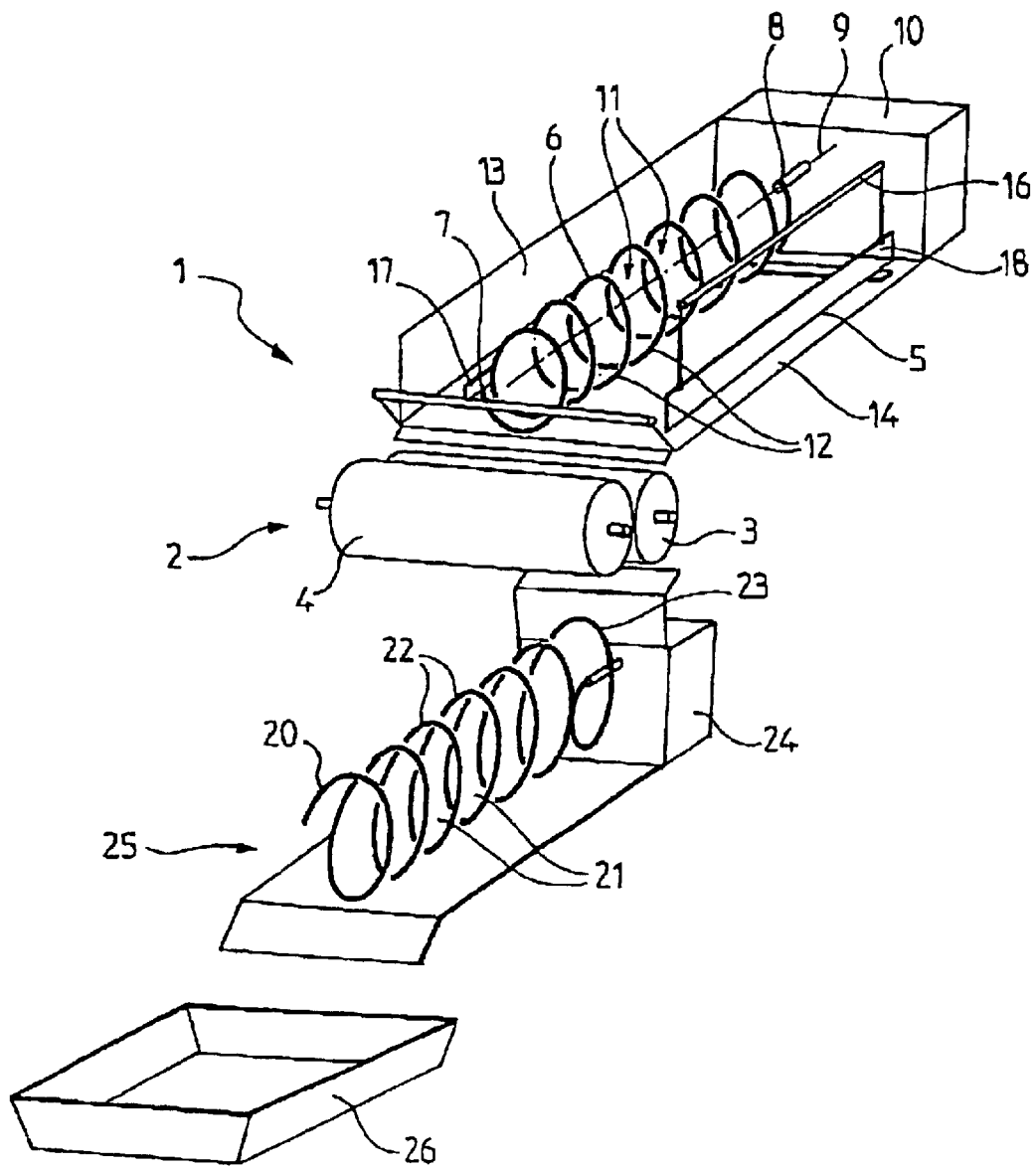
FIG. 1 is a simplified perspective view of the essential parts of a toaster insofar as concerns the invention.

More precisely, and with reference to FIG. 1, a toaster (1) comprises heating means (2) including heating rollers (3,4). Of course, and as already mentioned, these heating means can be formed differently, and the invention is not limited to this single form of heating means which was selected for the purpose of simplifying the figures in order to permit a better understanding.

Conforming to the invention, this toaster (1) equally comprises a loader (5) situated upstream of the heating means (2), which is intended to feed in a continuous manner the heating means (2) with bread slices to be toasted.

This loader is thus independent of the heating means; the toaster also comprises, if necessary, for example in the case of a pass-through toaster, a means for conveying the bread so as to pass in front of the heating means.

More precisely, this loader (5) comprises a rotatable element (6) having a geometrical spiral form. This rotatable element (6) presents one end (7) located substantially at the base of the heating means (2). The opposite end (8) of the rotatable element (6) is located at the level of the axis (9) of the spiral, and is connected to a motor for driving in rotation (10).

The rotatable element (6) in the form of a spiral defines a plurality of housings (11) between each of its turns (12). These housings (11) have a length corresponding substantially to the pitch of the spiral. The pitch of the spiral can vary from one model to the other as a function of the type of bread to be toasted. Thus, for bread slices of the sandwich bread or toast type, the pitch will be smaller than that observed on a toaster intended to toast thicker slices.

The rotatable element (6) in the form of a spiral can be constituted by a metal rod, coiled in the form of a screw. This rod can be of stainless steel or a material compatible with food contact. The capacity of the loader (5) can be from several slices to more than ten.

In the form illustrated, the loader (5) also comprises a chassis (13) permitting lateral guidance of the bread slices. This chassis (13) can be completed by a lower plate (14) intended to prevent the bread slices from dropping. Of course, the form of different chassis can be adopted as a function of the capacities of the loader and for esthetic considerations.

According to another characteristic of the invention, the toaster (1) can be equipped with a second rotatable element (20) in the form of a spiral intended to assure the recovery of the bread slices after their passage in the heating means (2). More precisely, this second rotatable element (20) can be identical to the first as illustrated particularly in FIGS. 2 and 3 without this being required. FIG. 1 shows, in this example, a second rotatable element mounted in the opposite direction to the first. This second rotatable element (20) equally defines a plurality of housings (21) between each of its turns (22), one of which is situated directly at the base of the heating means (2). This second rotatable element (20) is equally associated with a motor (24) that permits rotation in a direction provoking the advance of the bread slices that are stored to be assured.

In the form illustrated in FIG. 1, the second loader (25) permits transport of the toasted bread to the destination of a specific receptacle (26). Nevertheless, this receptacle is not required, and the toasted bread slices can be stored in the outlet loader (25).

Figure 2:
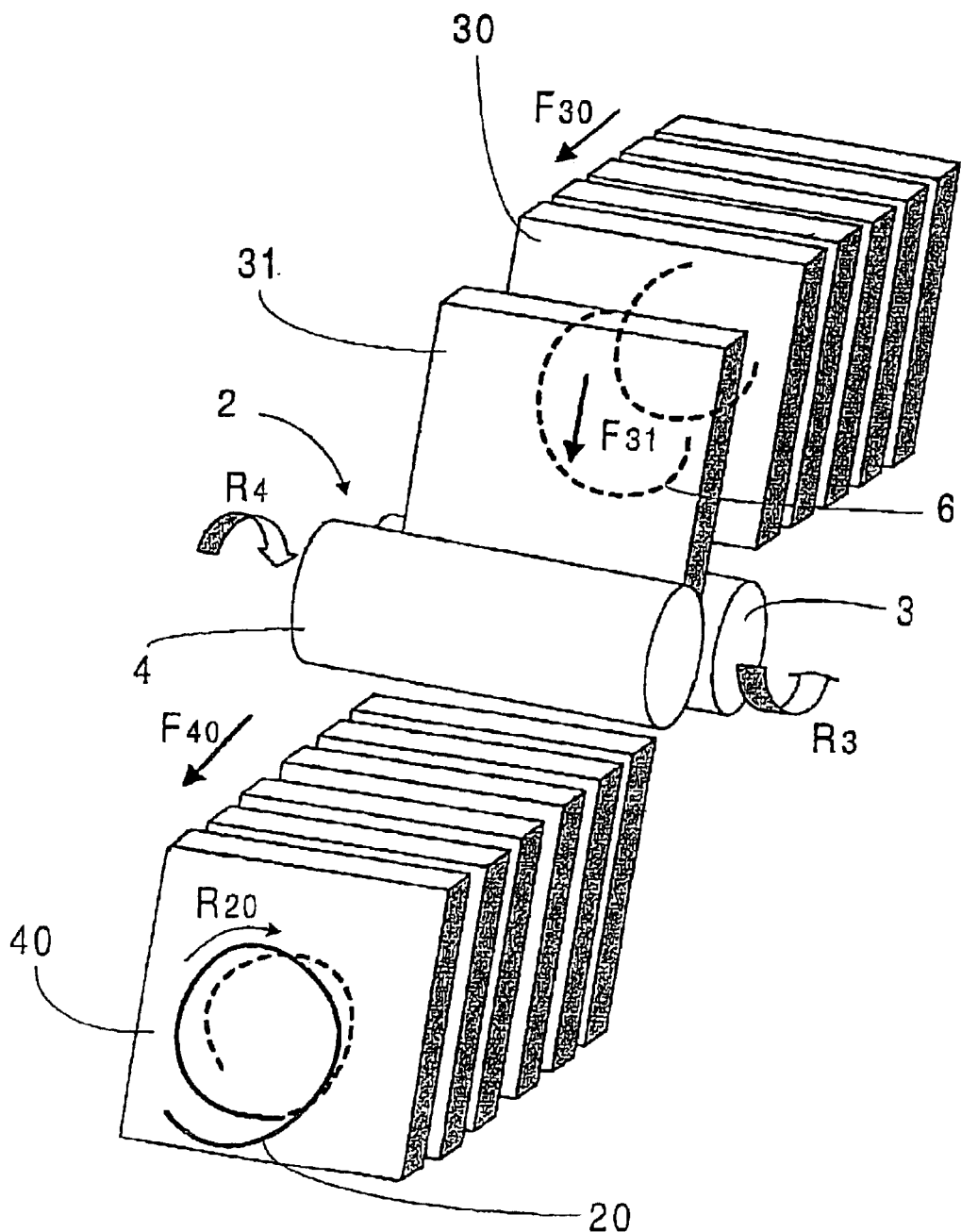
FIG. 2 is a similar drawing of the toaster in FIG. 1, illustrating the position of different bread slices at the interior of the characteristic loaders of the invention.

The drawing of FIG. 2 illustrates the manner in which the bread slices are displaced from the upper loader toward the heating means. Thus, when the bread slices (30) are pushed by the characteristic spiral (6) in the direction of the heating means (2) in the direction $F_{30}$, they reach the end of this rotatable element (6), which is found at the base of the heating means (2). Then, and by gravity, the end slices (31) drop in the direction $F_{31}$, until their lower edge comes in contact with the heating rollers (2) which carry the slices of bread along the passage plane (34).

These rollers (2) are driven by means that are synchronized in an appropriate manner with the drive motor of the spiral (6) of the upper loader (5). In this manner, the slices of bread are delivered to the heating means when these latter have had the time to toast the preceding slice.

In order to correctly carry the bread slices, rollers 3 and 4 are driven with mutually opposing rotation movements, $R_3$ and $R_4$, respectively.

The second rotatable element (20) driven in rotation movement R20, then permits recovery of the toasted bread slices (40) as soon as they are cooked, in displacing them between the turns of the rotatable element (20) in the direction of $F_{40}$.

Figure 3:
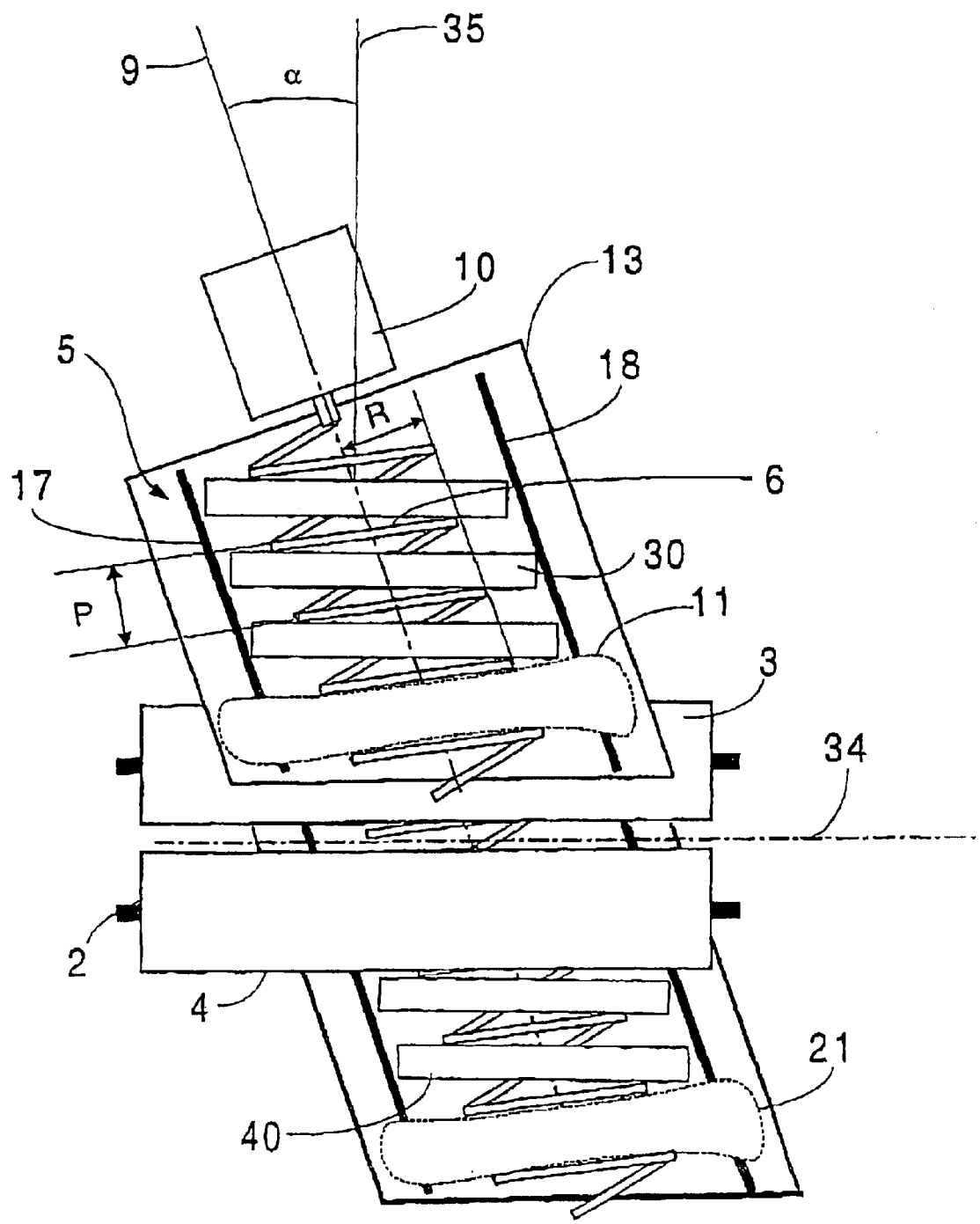
FIG. 3 is a top view of the toaster of FIG. 1.
Figure 4A:
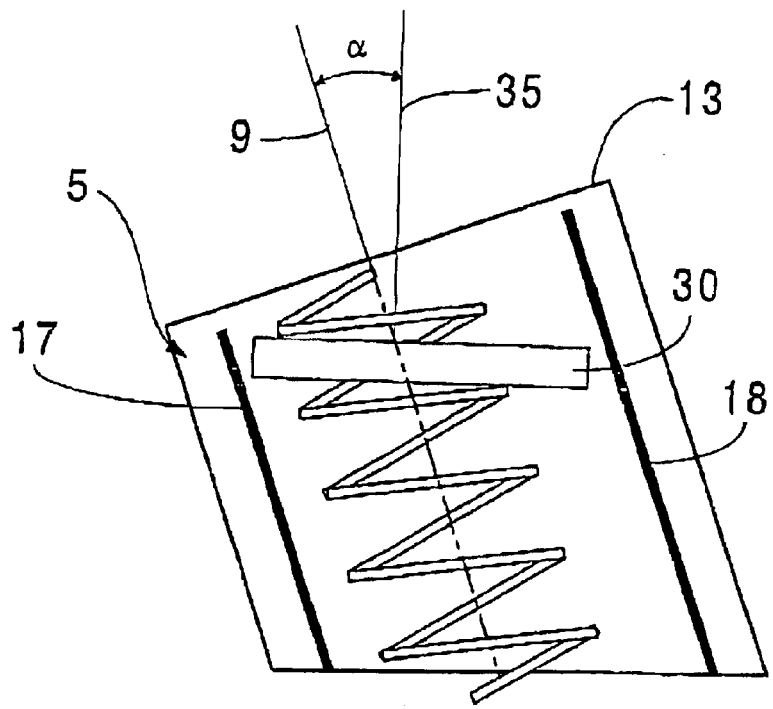
FIGS. 4a and 4b are top view explaining one of the particularities of the invention.
Figure 4B:
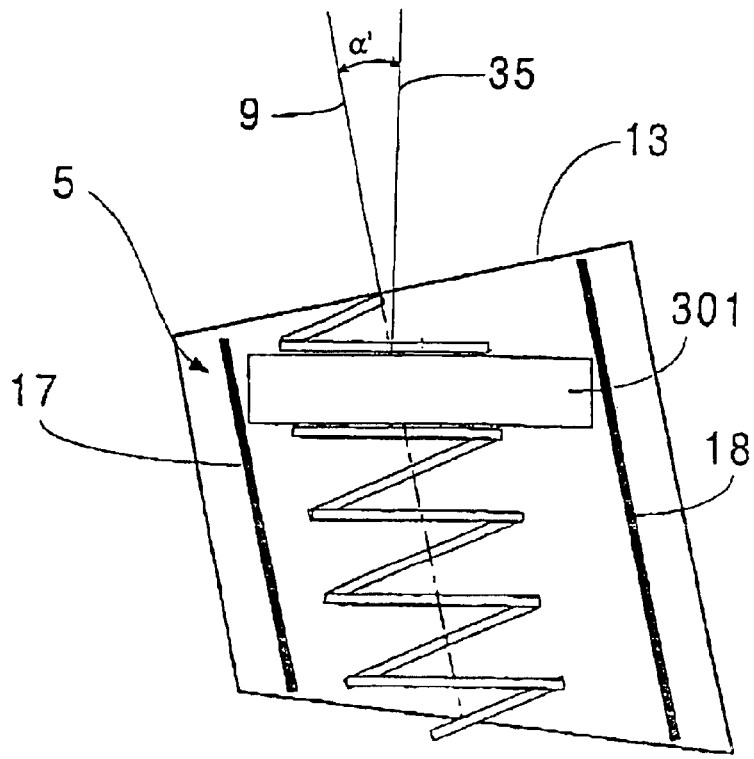

FIGS. 3, 4a, and 4b illustrate certain particular details of construction intended to optimize the operation of the toaster.

Thus, as illustrated in FIG. 3, the axis (9) of the spiral (6) of the upper loader (5) is not perpendicular to the plane (34) of passage of the slices at the interior of the heating means.

In effect, the bread slices are disposed between the turns of the spiral. According to the characteristics of the spiral and notably its radius R and its pitch P, but equally according to the thickness of the bread slices to be toasted, these latter rest against the turns and are oriented at a certain angle when the spiral is placed in rotation.

In order to guarantee a correct introduction of the bread slices between the rollers, the device is designed in such a manner that the bread slices progress in the loader while being parallel to the plane of passage (34). The bread slices, when they arrive close to the heating means (2), are thus substantially parallel to the plane of passage (34).

More precisely, the axis (9) of the spiral (6) forms with the perpendicular (5) to the plane of passage (34) an angle α of the order of around 20°. This angle α corresponds thus to the angle between the axis (9) of the rotatable element (6) and a perpendicular to the axis of the heating means (2). This arrangement permits a good introduction of the bread slices (31) between the heating means without risk of blocking or clogging. This angle α can thus be deduced from the measurement of the pitch P and of the radius R of the spiral (6) as well as the thickness of the bread slices to be toasted.

FIG. 4a reproduces in part FIG. 3 and shows the orientation a of the axis (9) of the spiral (6) with the perpendicular (35) to the plane of advancement of the bread slices (30) (substantially identical to the plane of passage of the bread between the rollers).

When using bread slices (301) having a greater thickness than the slices (30) such as shown in FIG. 4b, said slices are then oriented differently than the slices (30). It is thus necessary, in order for the advancement of the bread slices to remain parallel to the plane of passage of the bread between the rollers, to reduce the angle formed by the axis (9) of the spiral (6) with the perpendicular (35) to the plane of advancement, of the bread slices (301) to a value α', compared to the angle α of FIG. 4a.

In a simplified version of the invention, this angle is fixed and results from a compromise that is essentially a function of the thickness of the bread that is used most frequently, depending on eating habits. It is thus perfectly conceivable to customize the products depending on the country in which they are to be marketed.

Advantageously, in order to assure this parallelism with the advancement of the bread and the plane of passage of the bread between the rollers, there can be provided a device for angular adjustment of the loader relative to the heating device, for example by an angular clearance centered on the heating device.

The same arrangements of orientation of the axis of the spiral can be applied to the lower loader (25) assuring recovery of the toasted bread slices (40).

In order to improve the displacement of the slices, one can provide lateral guides (17,18) disposed to one side and the other of the spiral (6). These lateral guides (17,18) prevent bread slices from being displaced laterally and from leaving the spiral (6). These lateral guides (17,18) can then advantageously be adjustable in width in order to be adapted to different types of bread slices.

Figure 6A:
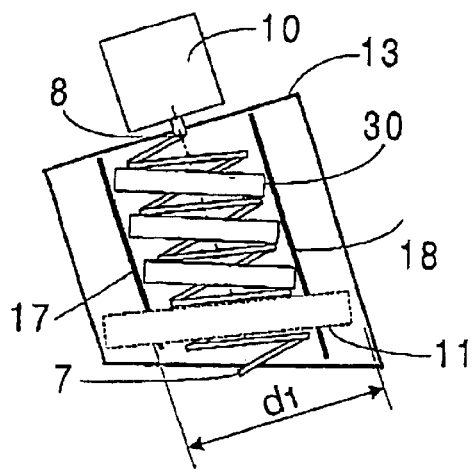
FIGS. 6a to 6f illustrate improvements regarding the holding of the bread during its displacement.
Figure 6B:
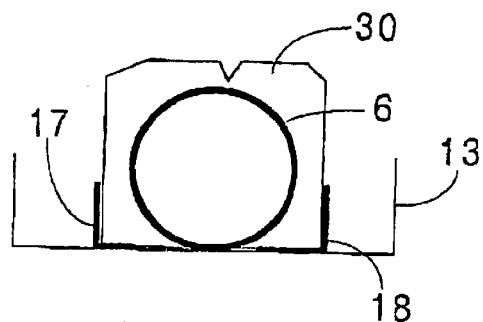
Figure 6C:
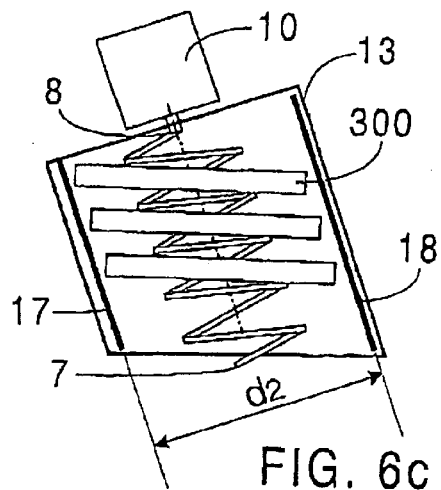
Figure 6D:
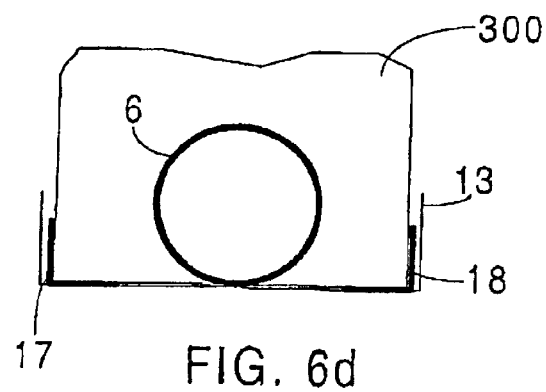

FIGS. 6a to 6d illustrate this principle. FIGS. 6a and 6c show in a top view two positions of the guides (17,18) depending on the size of the bread slices (30,300) which ends with a spacing between the guides respectively noted $d_1$, $d_2$. FIGS. 6b, 6d are front views of the device, corresponding respectively to FIGS. 6a and 6c.

The height of these lateral guides is determined as a function of the height of the bread slices capable of being toasted by the toaster according to the invention. For certain models, the inlet loader can also have anti-tilting abutments intended to come in contact with the slices in their upper part, to prevent these latter from tilting laterally.

Figure 6E:
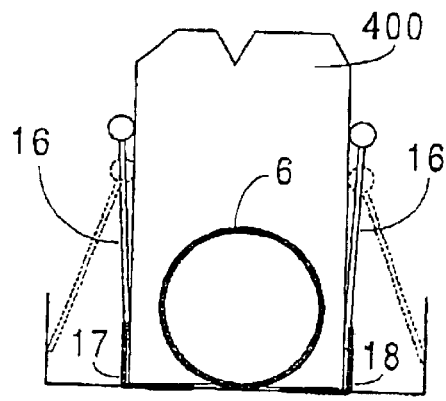
Figure 6F:
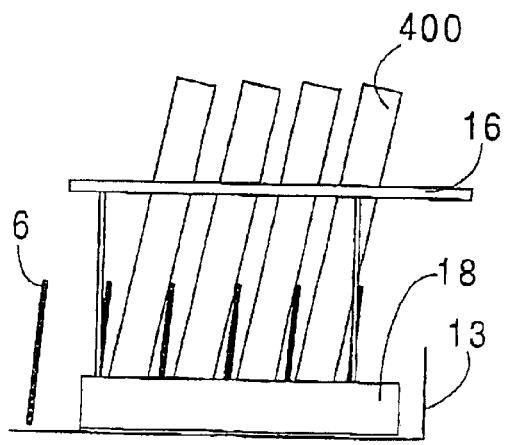

FIGS. 6e, 6f, shows in a front view and side view, such abutments, which can be directly associated with the lateral guides (17,18), or even be fixed to the chassis (13) of the loader (5), such as represented by dotted lines, and permits lateral holding of bread slices (400) of substantial height.

Figure 5:
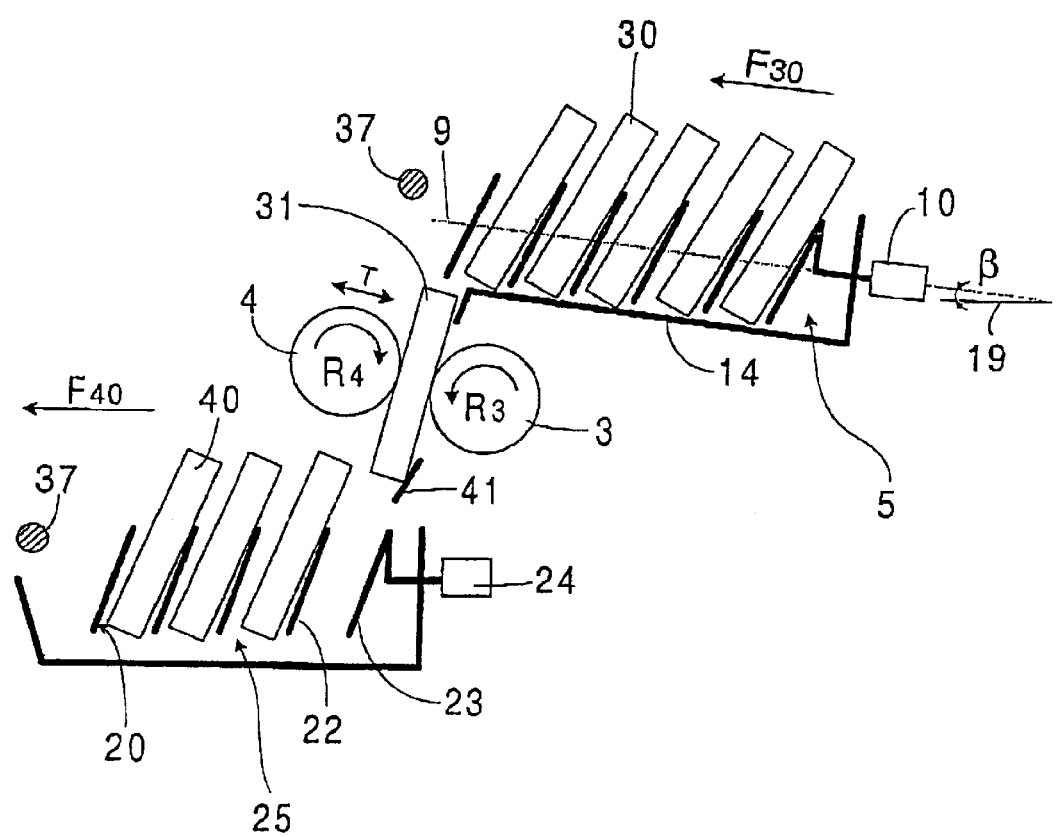
FIG. 5 is a side views of the toaster of FIG. 1.

The axis (9) of the spiral (6) can equally be oriented in a vertical plane as illustrated in FIG. 5. In this configuration, the axis (9) of the spiral (6) forms an angle β with the horizontal (19). The axis (9) of the spiral (6) and thus the lower plate (14) of the upper loader (5) are slightly oriented toward the top in the direction of displacement of the bread slices.

In this manner, bread slices (30) are more inclined with respect to the vertical than if the axis (9) of the spiral was exactly horizontal.

Thus, sliding of the bread slices (30), when these arrive at the end of the spiral (6), occurs without risk of tilting. This risk of tilting is greatly diminished by the presence of a transverse abutment (37) situated at the end of the upper loader (5), as illustrated in FIG. 5.

Thus, having arrived at the end of the upper loader (5), the slices of bread (31) at the end slide by gravity until coming in contact with the two heating rollers (3,4). The movement of these two rollers (3,4) then drives said slice of bread (31) at an appropriate speed for it to be toasted to the desired degree of cooking.

At the outlet of the heating rollers (3,4), the bread slice encounters a deflector (41) that orients it in the direction of the second spiral (20), between two consecutive turns (22). The lower loader (25) can be motorized in a manner synchronized with the heating rollers (3,4). The toasted bread slices (40) are accumulated in consecutive housings of the lower loader (25).

In the form illustrated in FIGS. 1 to 4, the heating means are constituted by heating rollers (3,4). Each heating roller can include a heating element of the sheathed resistance or quartz resistance type. It can equally be a matter of resistances wound on steatite or even on samicanite, or more generally any type of heating resistance arranged to radiate. These heating elements can be included in a toasting roller permitting at the same time driving of the bread slices and passage of radiant energy.

The heating means can also be constituted by heating rollers including a sheathed resistance. In one advantageous form, one of the rollers can be smooth, covered with a covering compatible with food contact. The other roller can advantageously be covered with a mesh that permits a good evacuation of water vapor generated during the cooking phase. One thus obtains a crisper bread.

In practice, at least one heating roller (3) can be movable with respect to the other in order to accept different bread thicknesses while coming in contact with the slices of bread to be toasted. Illustrated in FIG. 5, the roller (4) can thus be displaced transversely in the direction T. These rollers can be associated with return means permitting an appropriate pressure on the bread slices to be assured. It is of course equally envisionable in the framework of the invention, to make both of these heating rollers (3,4) movable with respect to one another.

Figure 7:
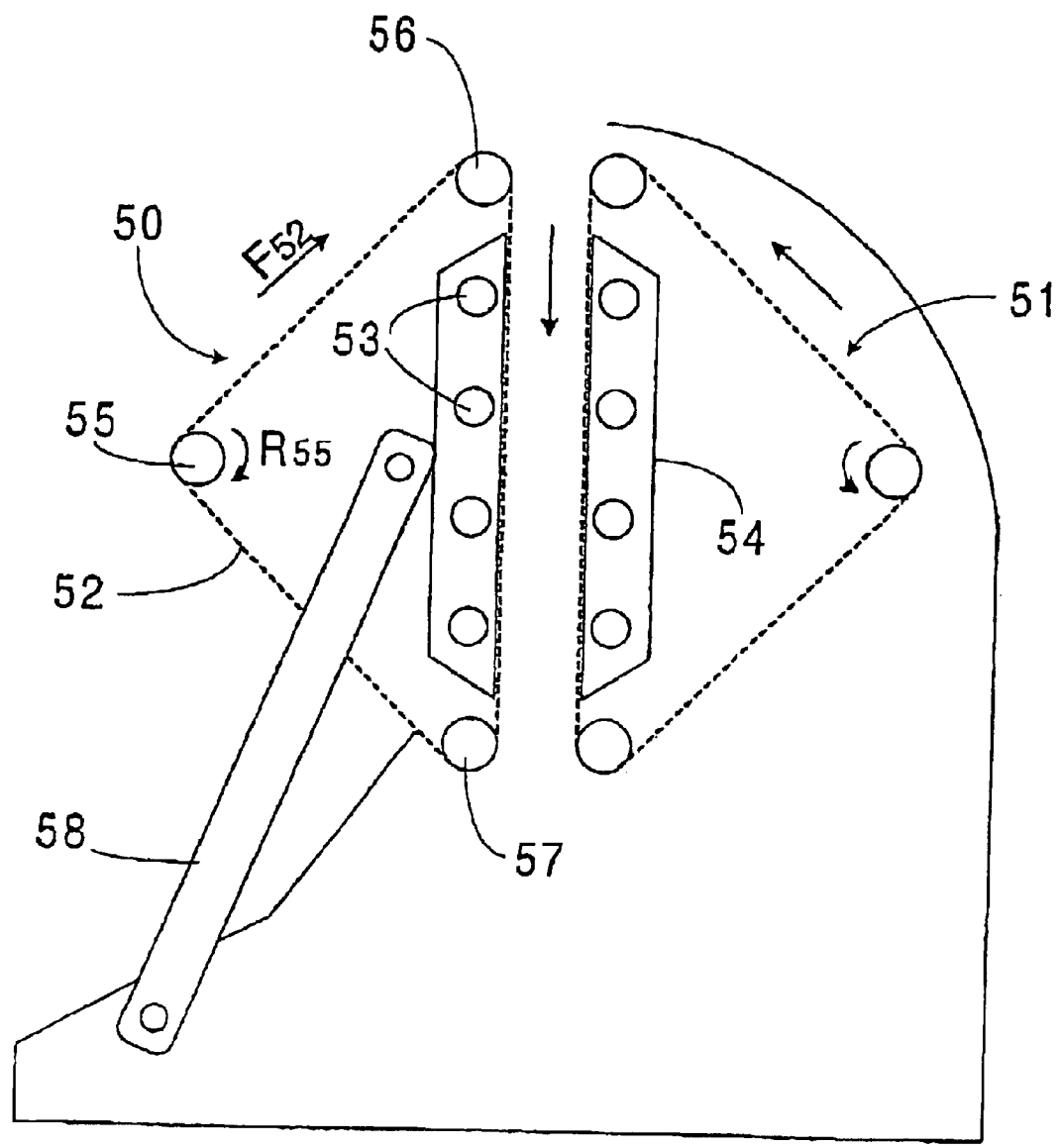
FIG. 7 is a side view of a preferred variant of construction of the heating means.

One variant of the heating means is illustrated in FIG. 7, in which one observes that the heating means comprise two symmetrical assemblies (50,51) comprising a perforated belt (52) circulating in the direction of passage of the slices, as well as a ramp of heating resistances (53). These heating resistances (53) can become, as already indicated, sheathed resistances, quartz resistances, or resistances wound on steatite or samicanite. The number of these resistances (53) can be adapted as a function of the power of the toaster model. Their number is thus not limited to the four resistances illustrated in FIG. 7. These resistances (53), which function by radiation, can advantageously be disposed in front of a metal reflector (54) intended to increase the heating power. The belt (52) that permits the driving of the bread slices can be made from a metal mesh or chain plates or even a belt made of fabric, chain, or a cabled fabric.

At least one of the heating assemblies (50,51) is connected to a return arm (58) assuring placement of the heating means on the slices of bread to be toasted.

In the form shown in FIG. 7, the moving belt (52) is driven, in the direction F52, by a motor roller (55) driven in rotation in the clockwise direction $R_{55}$, and passes around two freely rotating rollers (56,57). Of course, the invention is not limited to this single form of construction but equally covers variants in which the number of rollers driving the belt is reduced to two.

In a less improved form, the heating means can only include a single heating assembly and thus a single ramp of heating resistance and a simple moving belt. The opposed face of the bread slices is thus not heated, but simply receives contact with the moving belt.

Figure 8:
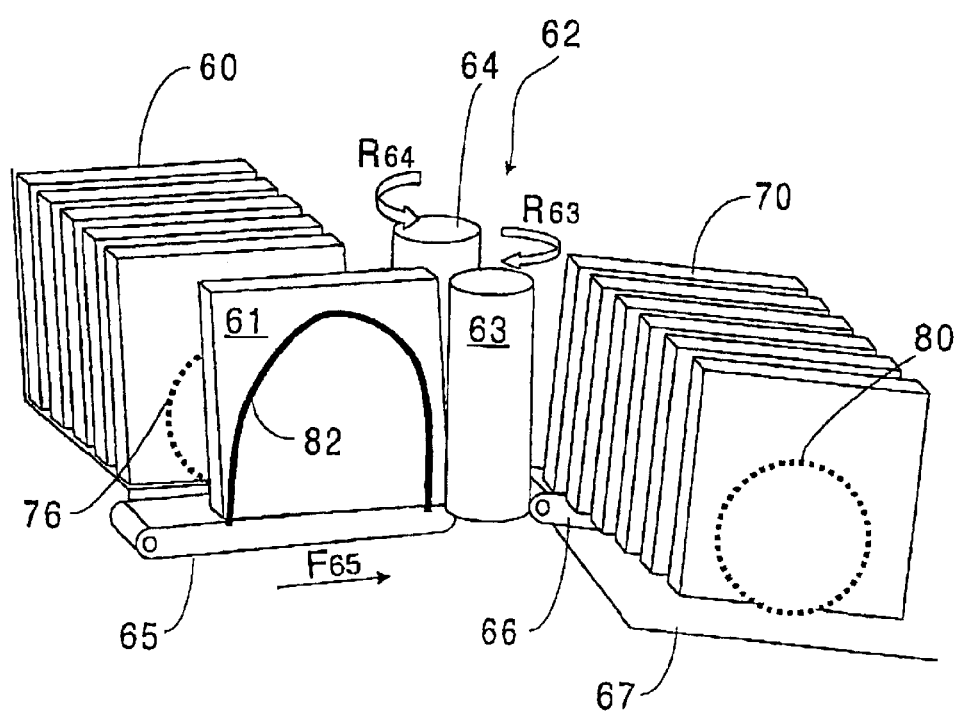
FIG. 8 is a schematic representation of a variant of the configuration of the toaster according to the invention.

As already mentioned, the invention is not limited to the single configuration illustrated in FIGS. 1 to 7 in which the bread slices pass vertically at the interior of the heating means. To the contrary, it equally covers variants that are not described here in detail but simply represented schematically in FIG. 8.

In this case, the bread slices can circulate horizontally to the interior of the heating means. A first loader transports the different bread slices (60) close to the heating means due to a spiral (76). Due to the progress of an inlet belt (65) in the direction $F_{65}$, the end slices (61) are introduced into the heating means by a vertical side. A maintenance abutment (82) correctly positions the bread slices (61) opposite the heating means. These heating means are constituted, for example, by two vertical rollers (63,64), driven in opposite rotational movements, $R_{63}$, $R_{64}$ respectively.

The bread slices thus pass horizontally between the heating rollers. They are then transported toward an outlet loader (67) by an outlet belt (66) situated close to the heating means (62) and progressing in a direction similar to that of the inlet belt (65). The toasted slices are then stored, by a spiral (80), in the outlet loader (67).

It results from the preceding that the improved toaster according to the invention has multiple advantages, and notably that of permitting an automatic feeding, which can for example be programmed with a large number of bread slices. The conception of the feeding loader is such that it is compatible with different thicknesses and geometries of bread slices.

The toasting can be carried out continuously if the upper loader is regularly fed. Nevertheless, this toaster is equally adapted to toast a single slice if necessary. In addition, the toaster according to the invention can have several juxtaposed loading and heating mechanisms, in order to be compatible with different types of bread slices.

What is claimed is:

1. Automatic toaster, comprising:
   heating means (2) in front of which pass bread slices to be toasted,
   means for transporting the bread slices toward the heating means,
   characterized in that said means for transporting the bread slices toward the heating means are independent of said heating means, are located upstream of said heating means and comprise a rotatable element (6) following a spiral form, defining a plurality of housings (11) for the bread slices (30), said housings (11) having a length corresponding substantially to the pitch P of the spiral (6).

2. Toaster according to claim 1, characterized in that the heating means (2) include means (52) for conveying the bread slices in succession.

3. Toaster according to claim 2, characterized in that the movement of the bread slices (31) in succession is effectuated vertically.

4. Toaster according to claim 2, characterized in that that the movement of the bread slices (61) in succession is effectuated horizontally.

5. Toaster according to claim 2, characterized in that the axis (9) of the spiral (6) is inclined in a horizontal plane at a non-zero angle α with respect to a perpendicular (35) to the plane of passage (34) of the bread slices into the heating means (2).

6. Toaster according to claim 3, characterized in that the axis (9) of the spiral (6) is inclined in a vertical plane by a non-zero angle β with respect to the horizontal (19).

7. Toaster according to claim 1, characterized in that the feeding means include an abutment (37) situated at the end of the rotatable element (6), able to prevent tilting of the bread slices (31) when these latter reach the end of said rotatable element (6).

8. Toaster according to claim 1, characterized in that it has means (25) for stocking bread slices coming from the heating means.

9. Toaster according to claim 8, characterized in that the means for stocking the bread slices comprise a receptacle and a second spiral shaped rotatable element (20) for conveying the bread slices to the receptacle.

10. Toaster according to claim 1, characterized in that the heating means (2) comprise at least one radiant heating element (53), and a conveyor (52) able to transport the bread slices in front of said heating element (53).

11. Toaster according to claim 1, characterized in that the heating means comprise at least one heating roller (3, 4) with which the bread slices (30) come in contact, said heating roller being able to convey the bread slices.

12. Automatic toaster, comprising:

heating means (2) in front of which pass bread slices to be toasted, means for transporting the bread slices toward the heating means, characterized in that said means for transporting the bread slices toward the heating means comprise a rotatable element (6) following a spiral form, defining a plurality of housings (11) for the bread slices (30), said housings (11) having a length corresponding substantially to the pitch P of the spiral (6), the heating means (2) include means (52) for conveying the bread slices in succession, and the axis (9) of the spiral (6) is inclined in a horizontal plane at a non-zero angle α with respect to a perpendicular (35) to the plane of passage (34) of the bread slices into the heating means (2).

13. Automatic toaster, comprising:

heating means (2) in front of which pass bread slices to be toasted, means for transporting the bread slices toward the heating means, characterized in that said means for transporting the bread slices toward the heating means comprise a rotatable element (6) following a spiral form, defining a plurality of housings (11) for the bread slices (30), said housings (11) having a length corresponding substantially to the pitch P of the spiral (6), the heating means (2) include means (52) for conveying the bread slices in succession, the movement of the bread slices (31) in succession is effectuated vertically, and the axis (9) of the spiral (6) is inclined in a vertical plane by a non-zero angle β with respect to the horizontal (19).

14. Automatic toaster, comprising:

heating means (2) in front of which pass bread slices to be toasted, means for transporting the bread slices toward the heating means, characterized in that said means for transporting the bread slices toward the heating means comprise a rotatable element (6) following a spiral form, defining a plurality of housings (11) for the bread slices (30), said housings (11) having a length corresponding substantially to the pitch P of the spiral (6), and the feeding means include an abutment (37) situated at the end of the rotatable element (6), able to prevent tilting of the bread slices (31) when these latter reach the end of said rotatable element (6).

15. Automatic toaster, comprising:

heating means (2) in front of which pass bread slices to be toasted, means for transporting the bread slices toward the heating means, characterized in that said means for transporting the bread slices toward the heating means comprise a rotatable element (6) following a spiral form, defining a plurality of housings (11) for the bread slices (30), said housings (11) having a length corresponding substantially to the pitch P of the spiral (6), said toaster has means for stocking bread slices coming from the heating means, and said means for stocking the bread slices comprise a receptacle (26) and a second spiral shaped rotatable element (20) for conveying the bread slices to the receptacle.

16. Automatic toaster, comprising:

heating means (2) in front of which pass bread slices to be toasted, means for transporting the bread slices toward the heating means, characterized in that said means for transporting the bread slices toward the heating means comprise a rotatable element (6) following a spiral form, defining a plurality of housings (11) for the bread slices (30), said housings (11) having a length corresponding substantially to the pitch P of the spiral (6), and the heating means comprise at least one heating roller (3, 4) with which the bread slices (30) come in contact, said heating roller being able to convey the bread slices.

* * * * *